US008659254B2

(12) United States Patent
Ueno (10) Patent No.: US 8,659,254 B2
(45) Date of Patent: Feb. 25, 2014

(54) SERVO SYSTEM, SERVO MOTOR DRIVING DEVICE, SAFETY UNIT AND METHOD FOR CONTROLLING SERVO SYSTEM

(75) Inventor: Junichi Ueno, Otsu (JP)

(73) Assignee: Omron Corporation, Kyoto (JP)

( * ) Notice: Subject to any disclaimer, the term of this patent is extended or adjusted under 35 U.S.C. 154(b) by 484 days.

(21) Appl. No.: 13/020,130

(22) Filed: Feb. 3, 2011

(65) Prior Publication Data
US 2011/0221377 A1 Sep. 15, 2011

(30) Foreign Application Priority Data
Mar. 15, 2010 (JP) ................................ 2010-057465

(51) Int. Cl.
G05B 23/02 (2006.01)
G01D 5/245 (2006.01)

(52) U.S. Cl.
USPC ............................ 318/565; 318/490; 318/602

(58) Field of Classification Search
USPC ......... 318/490, 560, 563–565, 602, 605, 638, 318/651–653, 661
See application file for complete search history.

(56) References Cited

U.S. PATENT DOCUMENTS

| | | | |
|---|---|---|---|
| 5,210,476 A | 5/1993 | Kazato | |
| 5,214,362 A | 5/1993 | Torii et al. | |
| 6,124,588 A | 9/2000 | Hagl et al. | |
| 7,068,002 B2 * | 6/2006 | Tsutsui | 318/560 |
| 2009/0309531 A1 * | 12/2009 | Hamahata | 318/565 |

FOREIGN PATENT DOCUMENTS

| | | |
|---|---|---|
| EP | 0 462 539 | 12/1991 |
| EP | 0 462 539 | 3/1997 |
| JP | 61-147306 | 7/1986 |
| JP | 06-259136 | 9/1994 |
| JP | H11-514091 A | 11/1999 |
| JP | 2001-350502 | 12/2001 |

OTHER PUBLICATIONS

Heidenhain, "Position Measurement System Complying with Safety Requirements", http://www.heidenhain.jp/fileadmin/pdb/media/img/596632-J1.pdf, Mar. 2008.
Extended European Search Report in EP Application No. 11153184. 4, dated Oct. 15, 2012.
ControlLogix™ Motion Module, Rockwell Automation, Excerpts: Table of Contents, Chapters 4 and 8, Feb. 2001.
Office Action in related Japanese Application No. 2010-057465, along with a partial English language translation, dated Jun. 19, 2012.

* cited by examiner

*Primary Examiner* — Bentsu Ro
(74) *Attorney, Agent, or Firm* — Greenblum & Bernstein, P.L.C.

(57) ABSTRACT

A servo driver sets an instruction value for an operation of a servo motor based on an instruction signal from a controller. The servo driver sends the instruction value and a feedback value obtained based on a feedback signal to a safety unit. When at least one of the instruction value and the feedback value sent by the servo driver has an abnormal value, an STO signal is generated and sent to the servo driver. When the STO signal is input to the servo driver, the servo driver stops the supply of electricity to the servo motor.

18 Claims, 7 Drawing Sheets

SERVO SYSTEM, SERVO MOTOR DRIVING DEVICE, SAFETY UNIT AND METHOD FOR CONTROLLING SERVO SYSTEM

CROSS-REFERENCE TO RELATED APPLICATION

This application claims benefit of priority under 35 U.S.C. §119 to Japanese Patent Application No. P2010-057465 filed on Mar. 15, 2010, which is expressly incorporated herein by reference in its entirety.

BACKGROUND

1. Field of the Disclosure

The present disclosure relates to a servo system, a servo motor driving device, a safety unit and a method for controlling a servo system.

2. Background Information

Servo systems are used for positioning control of movable portions of various machines, for example. An example of such a servo system includes a servo motor for operating various types of mechanical equipment, an encoder attached to the servo motor, a servo driver for driving the servo motor, and a control device for outputting position instruction information or the like to the servo driver.

Recently, along with reducing costs and improving productivity, taking measures to assure safety for workers has become an important issue in the manufacturing scenes. For this reason, there has been an increased demand for servo systems as described above to comply with safety standards. IEC61800 was established as a safety standard for adjustable speed electrical power drive systems such as systems provided with a servo motor.

Part 5-2 of IEC61800 (hereinafter referred to as "IEC61800-5-2"), which was issued in July 2007, stipulates safety requirements in terms of functions, namely, requirements regarding a safety motion function.

Also, IEC61508 is also established as such a safety standard. IEC61508 is international standards regarding the functional safety of electrical/electronical/programmable electronic safety-related systems. In IEC61508, the failure probability of a system is stipulated by a scale called SIL (Safety Integrity Level). Requirements to be satisfied are defined for each SIL, thereby clarifying issues to be fulfilled by the safety control system to be constructed. SIL is made up of four levels, SIL1 to SIL4, and SIL4 is the highest level. IEC61800-5-2 also adopts SIL in evaluation of the safety level of system construction.

In order to assure safety in a system including a servo motor, it is necessary that an encoder precisely detects the rotational speed, rotational position or the like of the servo motor. For this purpose, there has been a demand for assuring reliable encoder outputs. There is also a demand for countermeasures, such as stopping supply of electricity to the servo motor when the detection result from the encoder is abnormal.

The easiest method for assuring reliable encoder outputs is to provide the encoder with redundant (e.g. duplicate) internal circuitry and thereby verify that the output data from the encoder is correct. Also, in the case of an encoder of the SIN/COS type in which sine (SIN) signals and cosine (COS) signals are generated, a method is also known in which it is proved that two mutually independent SIN and COS systems are constantly in a predetermined relation based on the relation $SIN^2+COS^2=1$.

For example, JP H11-514091A discloses a measurement system including two mutually independent encoders of SIN/COS type.

Also, for example, "Position Measurement System Complying with Safety Requirements", March 2008 (online) (searched on Feb. 18, 2010), Internet URL:http://www-.heidenhain.jp/file_admin/pdb/media/img/596632-J1.pdf discloses a method for generating two mutually independent positional data sets by simultaneously performing scanning inside the encoders. With this method, two positional data sets are sent to a monitoring device provided on the safety control side. The monitoring device compares the two positional data sets to each other, and sends these two positional data sets and an error bit independent thereform to the safety control side. On the safety control side, it is regularly monitored whether the position measurement system complying with safety requirements operates properly.

If two independent encoders are installed, an installation area that is twice as large as that required in the case where one encoder is installed is required. In addition, the cost of the system increases as the number of encoders increases. Moreover, in order to realize highly accurate detection, the initial settings of the two encoders should be carried out strictly so that the detection values of the two encoders do not deviate from each other. However, additional time and costs for the initial settings of the encoders are necessary. Also, when the two encoders have the same circuitry, common failures may occur in these encoders.

Also, if an encoder is used in which two mutually independent positional data sets are generated, such as the encoder of the SIN/COS type, or if two mutually independent encoders are used as described above, feedback control with the use of two data sets may be complicated. In addition, since the circuitry is configured to generate two data sets with one encoder, the cost for the encoder may increase.

Furthermore, an encoder of the SIN/COS type generally outputs analog signals. When the transmission distance of an analog signal is long, the signal tends to attenuate or be affected by noise, and thus the reliability of the detection value decreases. In order to avoid such issues, it is desirable for the encoder to have a function of sending digital values.

However, in order to prove that a logic for communicating digitally complies with safety requirements, the logic has to be manufactured with the development procedure stipulated in IEC61508. Specifically, a component that outputs a plurality of signals for diagnosing failures in the encoder is necessary. Conventionally, safety control systems were constructed using an encoder developed especially for this purpose. Accordingly, replacing an existing system with a system that complies with safety standards required extensive modifications of the system.

SUMMARY

A non-limiting feature of the disclosure is to assure safety of a servo system without replacing the encoder used in the servo system with an encoder having a safety function.

In accordance with one feature of the disclosure, a servo system is provided including a servo motor, a controller that outputs an instruction signal that controls driving of the servo motor, an encoder that detects an operation of the servo motor and outputs a feedback signal representing the detected operation, a servo driver, and a safety monitor. The servo driver generates an instruction value for the operation of the servo motor by using the instruction signal from the controller and the feedback signal from the encoder and drives the servo motor in accordance with the instruction value. The safety monitor monitors whether the servo motor is controlled in a normal state by comparing a predetermined parameter therein (speed range, position range or the like) with the feedback signal from the encoder. As long as the servo driver performs control in a normal state, normal operation can be continued. When the safety monitor determines that the servo driver does not perform control in a normal state, output of torque from the servo motor is stopped as a result of the stop signal from the safety monitor to the servo driver been directly received by an output stop circuit of the servo driver. At this time, it is important that the feedback signal from the encoder, which the safety monitor uses as determination criterion, is normal. For this reason, the safety monitor acquires from the servo driver the instruction value and a feedback value that is obtained based on the feedback signal as a result of the servo motor having been driven in accordance with the instruction value, and generates a stop signal when one or both of the instruction value and the feedback value have an abnormal value.

Preferably, the safety monitor generates the stop signal when a predetermined condition for determining that one or both of the instruction value and the feedback value have an abnormal value is satisfied. The predetermined condition is at least one of a first condition that a difference between the instruction value and the feedback value is outside a predetermined acceptable range, a second condition that the instruction value exceeds a predetermined first upper limit value, and a third condition that the feedback value exceeds a predetermined second upper limit value.

Preferably, the instruction value includes a value for instructing a rotational speed of the servo motor.

Preferably, the servo driver stops the supply of electricity to the servo motor in response to the stop signal.

In accordance with another feature of the disclosure, there a servo motor driving device is provided for driving a servo motor. The servo motor driving device includes a servo driver and a safety monitor. The servo driver generates an instruction value for an operation of the servo motor by using an instruction signal for controlling driving of the servo motor sent by a controller, and a feedback signal for detecting the operation of the servo motor sent by an encoder, and drives the servo motor in accordance with the instruction value. The safety monitor stops output of torque from the servo motor, or the servo driver controls the servo motor as a result of receiving a stop signal from the safety monitor such that the servo motor stops output of torque. The safety monitor acquires from the servo driver the instruction value and a feedback value that is obtained based on the feedback signal as a result of the servo motor having been driven following the instruction value, and generates the stop signal when at least one of the instruction value and the feedback value has an abnormal value.

Preferably, the safety monitor generates the stop signal when a predetermined condition for determining that at least one of the instruction value and the feedback value has an abnormal value is satisfied. The predetermined condition is at least one of a first condition that a difference between the instruction value and the feedback value is outside a predetermined acceptable range, a second condition that the instruction value exceeds a predetermined first upper limit value, and a third condition that the feedback value exceeds a predetermined second upper limit value.

Preferably, the instruction value includes a value for instructing a rotational speed of the servo motor.

Preferably, the servo driver stops the supply of electricity to the servo motor in response to the stop signal.

In accordance with another feature of the disclosure, there is provided a safety monitor used in a servo system. The servo system includes a servo motor, a controller that outputs an instruction signal for controlling driving of the servo motor, an encoder that detects an operation of the servo motor and generates a feedback signal representing the detected operation, and a servo driver that generates an instruction value for the operation of the servo motor by using the instruction signal from the controller and the feedback signal from the encoder, and drives the servo motor in accordance with the instruction value. The servo driver controls the servo motor as a result of receiving a stop signal from the safety monitor such that servo motor stops output of torque. The safety monitor includes a determiner for determining whether at least one of the instruction value and the feedback value obtained based on the feedback signal satisfies a predetermined condition, and a signal generator for generating the stop signal when the determiner determines that at least one of the instruction value and the feedback value satisfies the predetermined condition.

Preferably, the predetermined condition includes at least one of a first condition that a difference between the instruction value and the feedback value is outside a predetermined acceptable range, a second condition that the instruction value exceeds a predetermined first upper limit value, and a third condition that the feedback value exceeds a predetermined second upper limit value.

Preferably, the instruction value includes a value for instructing a rotational speed of the servo motor.

Preferably, the servo driver stops the supply of electricity to the servo motor in response to the stop signal.

In accordance with another feature of the disclosure, a method for controlling a servo system is provided. The servo system has a servo motor, a controller that outputs an instruction signal for controlling driving of the servo motor, an encoder that detects an operation of the servo motor and generates a feedback signal representing the detected operation, a servo driver, and a safety monitor. The servo driver generates an instruction value for the operation of the servo motor by using the instruction signal from the controller and the feedback signal from the encoder, and drives the servo motor such that the servo motor's operation follows the instruction value. The safety monitor is connected to a circuit that stops output of torque from the servo motor. The servo driver is configured such that output of torque from the servo motor is inhibited as a result of receiving a stop signal from the safety monitor. The method for controlling a servo system includes determining whether at least one of the instruction value and a feedback value obtained based on the feedback signal satisfies a predetermined condition, and generating the stop signal when it is determined in the step of determining that at least one of the instruction value and the feedback value satisfies the predetermined condition.

Preferably, the predetermined condition includes at least one of a first condition that a difference between the instruction value and the feedback value is outside a predetermined acceptable range, a second condition that the instruction value exceeds a first upper limit value, and a third condition that the feedback value exceeds a second upper limit value.

Preferably, the instruction value includes a value for instructing a rotational speed of the servo motor.

Preferably, the servo driver stops the supply of electricity to the servo motor in response to the stop signal.

Accordingly, the safety of the servo system can be assured without replacing the encoder used in the servo system with an encoder having a safety function.

DETAILED DESCRIPTION

Hereinafter, preferred embodiments of the disclosure will be described in detail with reference to the drawings. In the drawings, identical or equivalent components are designated by identical numerals, and the overlapping description is omitted.

Figure 1:
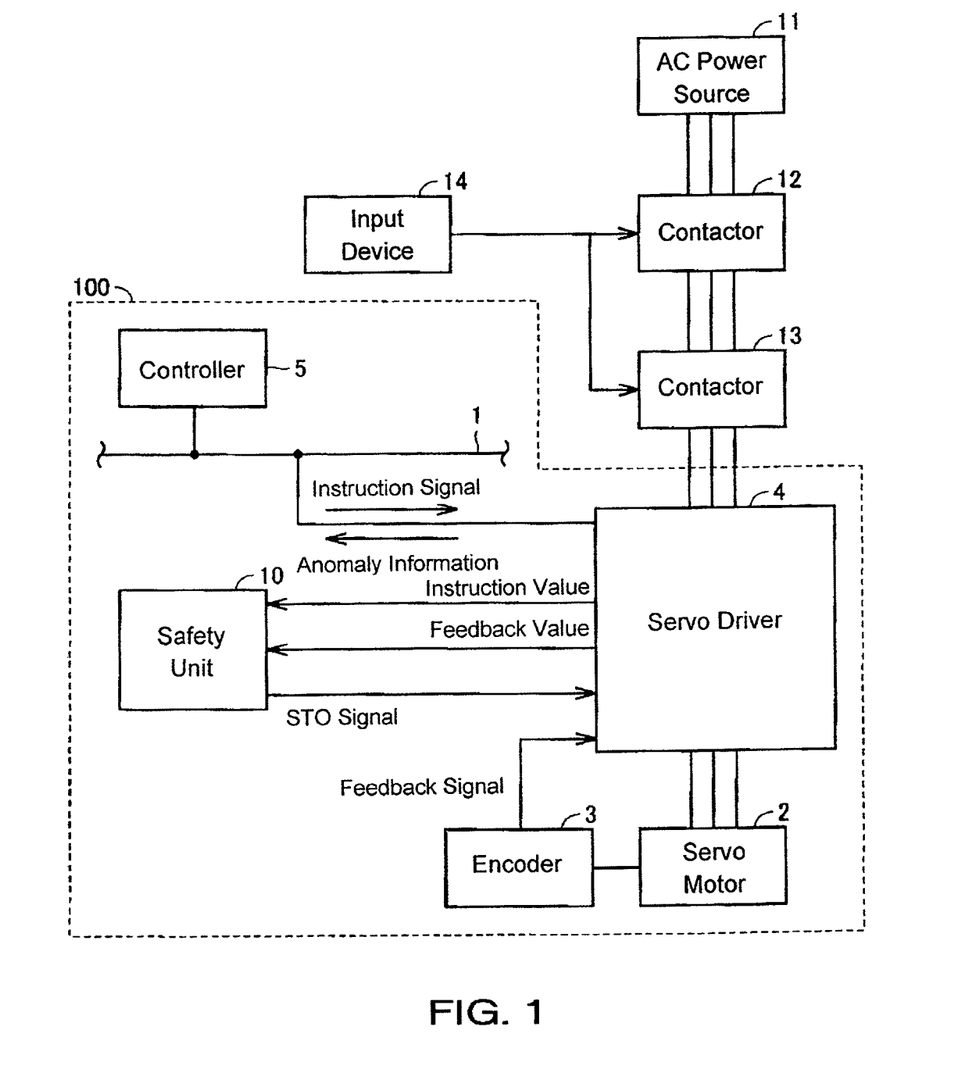
FIG. 1 is a schematic configuration diagram illustrating a servo system according to an embodiment of the disclosure.

FIG. 1 is a schematic configuration diagram illustrating a servo system according to an embodiment of the disclosure. Referring to FIG. 1, a servo system 100 is used as a system for driving various types of mechanical equipment not shown in the drawings (e.g., arms of industrial robots). The servo system 100 includes a network 1, a servo motor 2, an encoder 3, a servo driver 4, a controller 5 and a safety unit 10.

The servo motor 2 is an AC servo motor, for example. The encoder 3 is attached to the servo motor 2 in order to detect an operation of the servo motor 2. The encoder 3 generates a feedback signal representing the detected operation of the servo motor 2, and sends the feedback signal to the servo driver 4. The feedback signal contains, for example, positional information on the rotational position (angle) of a rotational axis of the servo motor 2, information on the rotational speed of the rotational axis. The encoder 3 may be a typical incremental encoder, or an absolute encoder.

The servo driver 4 receives an instruction signal from the controller 5 via the network 1, and also receives the feedback signal output by the encoder 3. The servo driver 4 drives the servo motor 2 based on the instruction signal from the controller 5 or the feedback signal from the encoder 3. Also, the servo driver 4 sends anomaly information indicating an internal anomaly to the controller 5 via the network 1.

The servo driver 4 receives alternating-current (AC) power from an AC power source 11 via contactors 12 and 13. In this embodiment, the servo driver 4 is of a type that receives three-phase alternating current, but it may also be of a type that receives single-phase alternating current. The contactors 12 and 13 are turned on/off by a signal sent by an input device 14 such as a door switch or safety light curtain.

The servo driver 4 sets an instruction value for the operation of the servo motor 2 based on the instruction signal from the controller 5. In addition, the servo driver 4 drives the servo motor 2 such that the servo motor 2 operates following the instruction value. Specifically, the servo driver 4 controls the driving current of the servo motor 2 according to the instruction value.

Furthermore, the servo driver 4 sends the instruction value and the feedback value obtained from the feedback signal to the safety unit 10. The instruction value is a speed instruction value for example, and the feedback value is the rotational speed of the servo motor 2.

When an STO signal serving as a stop signal is further input to the servo driver 4, the servo driver 4 stops output of torque by the servo motor 2. Specifically, when the STO signal is input to the servo driver 4, the servo driver 4 stops supplying a driving current to the servo motor 2.

The controller 5 includes, for example, a programmable controller (PLC), a position control unit or the like, and sends instruction signals for controlling driving (e.g., positioning control) of the servo motor 2.

If at least one of the instruction value and the feedback value sent by the servo driver 4 is an abnormal value, the safety unit 10 generates the STO signal and sends the generated STO signal to the servo driver 4.

Figure 2:
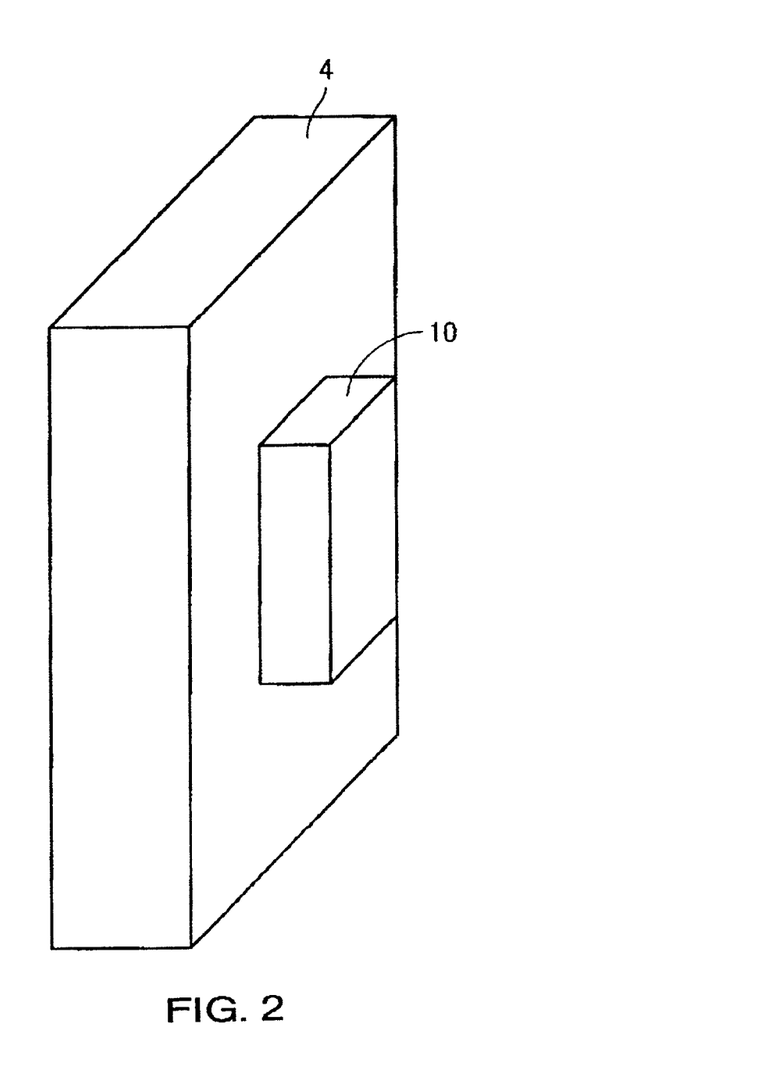
FIG. 2 is a diagram illustrating one embodiment of a servo driver and a safety unit shown in FIG. 1.

FIG. 2 is a diagram illustrating one embodiment of the servo driver and the safety unit shown in FIG. 1. The servo driver and the safety unit constitute a servo motor driving device for driving the servo motor.

Referring to FIG. 2, in this embodiment, the servo driver 4 and the safety unit 10 are realized as separate devices. Although not shown in the drawings, the safety unit 10 not only receives the instruction value and the feedback value from the servo driver 4, but also sends the STO signal to the servo driver 4, as a result of being connected to the servo driver 4 via connecting means such as a connector or cable.

The safety unit and the servo driver may be formed as a single piece. For example, the servo driver 4 and the safety unit 10 may be accommodated in a single casing.

Figure 3:
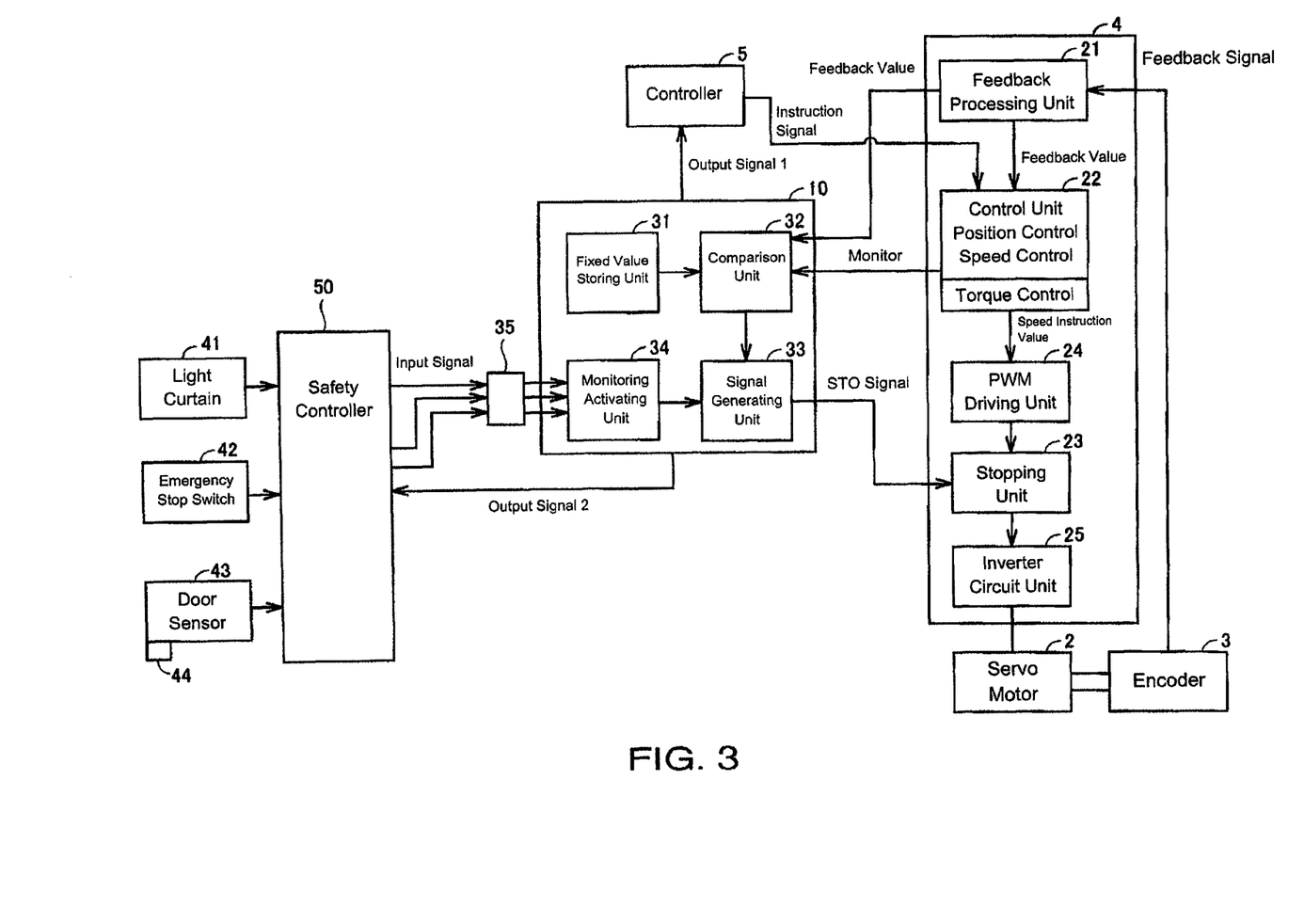
FIG. 3 is a functional block diagram illustrating a configuration of the servo driver and the safety unit shown in FIG. 1.

FIG. 3 is a functional block diagram illustrating a configuration of the servo driver and the safety unit shown in FIG. 1. Referring to FIG. 3, the servo driver 4 includes a feedback processing unit 21, a control unit 22, a pulse width modulation (PWM) driving unit 24, an inverter circuit unit 25 and a stopping unit 23.

The feedback processing unit 21 generates a feedback value based on the feedback signal from the encoder 3. For example, when pulses are output from the encoder 3, the feedback processing unit 21 calculates the rotational speed of the servo motor 2 by counting the pulses, and also generates the feedback value containing a value representing that rotational speed. In addition to the rotational speed of the servo motor 2, the feedback value may contain a value concerning the rotational position (angle) of the rotational axis of the servo motor 2.

The feedback processing unit 21 sends the feedback value to the control unit 22 and also outputs the feedback value to the outside of the servo driver 4. The feedback value output by the servo driver 4 is sent to the safety unit 10.

The control unit 22 receives an instruction signal from the controller 5, and also receives a feedback value from the feedback processing unit 21. The control unit 22 generates an instruction value for executing positional control, speed control and torque control by feedback control based on the instruction signal and the feedback value. Note that the speed control is described below. The control unit 22 generates a speed instruction value by the feedback control based on the instruction signal and the feedback value (rotational speed). The speed instruction value is sent to the stopping unit 23 and also output to the outside of the servo driver 4. The speed instruction value output by the servo driver 4 is sent to the safety unit 10 as a monitor signal.

When the stopping unit 23 receives an STO signal from the safety unit 10, the stopping unit 23 stops the inverter circuit unit 25 by not allowing a PWM signal to electrically pass therethrough. Consequently, output of torque by the servo motor 2 stops. In contrast, when no STO signal is input to the stopping unit 23, the stopping unit 23 allows the speed instruction value output by the control unit 22 to pass therethrough.

The inverter circuit unit 25 receives signals from the PWM driving unit 24 via the stopping unit 23. Although not shown in the drawings, the inverter circuit unit 25 is configured from a semiconductor switching element such as an IGBT (Insulated Gate Bipolar Transistor). The PWM driving unit 24 generates signals for turning on/off the switching element according to PWM based on the speed instruction value. The inverter circuit unit 25 turns on/off the switching element according to the signals. Thus, electricity is supplied to the servo motor 2, and the servo motor 2 is driven according to the speed instruction value. In contrast, when the stopping unit 23 is operating, the signal from the PWM driving unit 24 is set to off. Thus, electricity is not supplied to the servo motor 2, and the servo motor 2 stops. As a result of the servo motor 2 stopping, output of torque by the servo motor 2 stops.

The safety unit 10 includes a fixed value storing unit 31, a comparison unit 32, a signal generating unit 33 and a monitoring activating unit 34. Upper limit and lower limit values of an acceptable range for the difference between the speed instruction value and the feedback value are stored in the fixed value storing unit 31 in advance.

The comparison unit 32 receives the speed instruction value and the feedback value from the servo driver 4. The comparison unit 32 compares the difference between the speed instruction value and the feedback value with the upper limit value of the acceptable range, and outputs the result of the comparison. The comparison unit 32 also compares the difference between the speed instruction value and the feedback value with the lower limit value of the acceptable range, and outputs the result of the comparison. The upper and lower limit values of the acceptable range are stored in the fixed value storing unit 31 in advance, and the comparison unit 32 uses the upper and lower limit values stored in the fixed value storing unit 31. It is possible to determine whether the difference between the speed instruction value and the feedback value is within the acceptable range, based on the output from the comparison unit 32.

The upper limit value of the speed instruction value and that of the feedback value are stored in the fixed value storing unit 31 in advance. Note that for the purpose of distinction, hereinafter the upper limit value of the speed instruction value will be referred to as a "first upper limit value", and the upper limit value of the feedback value will be referred to as a "second upper limit value". The comparison unit 32 compares the speed instruction value acquired from the servo driver 4 and the first upper limit value stored in the fixed value storing unit 31. Similarly, the comparison unit 32 compares the feedback value acquired from the servo driver 4 with the second upper limit value stored in the fixed value storing unit 31. Consequently, it is possible to determine whether the speed instruction value exceeds the first upper limit value, based on the output from the comparison unit 32. Similarly, it is possible to determine whether the feedback value exceeds the second upper limit value, based on the output from the comparison unit 32.

Based on the output from the comparison unit 32, the signal generating unit 33 determines whether a state in which any of the upper limit values is exceeded falls under an abnormal state. If the monitoring activating unit 34 is set to a monitoring-activated state due to a signal input to a signal input unit 35, the signal generating unit 33 determines that the state in which the speed instruction value or the feedback value exceeds the corresponding upper limit value falls under an abnormal state, generates an STO signal and sends the STO signal to the servo driver 4.

Specifically, the signal generating unit 33 determines whether the difference between the speed instruction value and the feedback value is within the acceptable range. When the difference is determined to be outside the acceptable range, the signal generating unit 33 generates the STO signal.

Furthermore, the signal generating unit 33 determines whether the speed instruction value exceeds the first upper limit value. When the speed instruction value is determined to exceed the first upper limit value, the signal generating unit 33 generates the STO signal.

Furthermore, if a request for activating the monitoring function of the monitoring activating unit 34, which is made due to a signal input to the signal input unit 35 from the outside, is received, the signal generating unit 33 determines whether the feedback value exceeds the second upper limit value. When the feedback value is determined to exceed the second upper limit value, the signal generating unit 33 generates the STO signal.

If the monitoring function of the monitoring activating unit 34 is not activated, even when a state has occurred in which any of the speed instruction value and the feedback value exceeds the corresponding upper limit value, the signal generating unit 33 does not determine that state as an abnormal state. The monitoring activating unit 34 outputs a flag indicating whether the monitoring function is active or not to the signal generating unit 33. When the monitoring activating unit 34 is in a monitoring-activated state (that is, when the monitoring function is active), the flag is set to 0, and when the monitoring function of the monitoring activating unit 34 is not active (not in a monitoring-activated state), the flag is set to 1.

A safety controller 50 receives an input of a signal from a light curtain 41, an emergency stop switch 42, a door sensor 43 (which may include a key 44 attachable to the body of the door sensor 43) or the like, and the safety controller 50 inputs the signal to the signal input unit 35. Signals input from the safety controller 50 to the signal input unit 35 include emergency stop (E-STOP), safety stop 1 (SS1), safety stop 2 (SS2), safety stop 3 (SOS), speed limitation (SLS), for example.

The comparison unit 32 compares the second upper limit value with the feedback value for each monitoring function. For example, the second upper limit value serves as a speed limit value while the speed limit function is active, and serves as a permissible movement amount (position) from a stop position under the signal of safety stop 2. The signals output by the comparison unit 32 may be a signal indicating positional anomaly, a signal indicating speed anomaly, a signal indicating acceleration anomaly, a signal indicating instruction anomaly, and/or a signal indicating feedback anomaly.

The safety unit 10 outputs signals to the controller 5 and the safety controller 50. The signal output from the safety unit 10 may be a deceleration instruction, a signal indicating that STO is being carried out, a signal indicating that SS1 is being carried out, a signal indicating that SS2 is being carried out, a signal indicating that SOS is being carried out, and/or a signal indicating that SLS is being carried out, for example. Whether these signals are to be sent to either the controller 5 or the safety controller 50 can be appropriately selected depending on the application.

Figure 4:
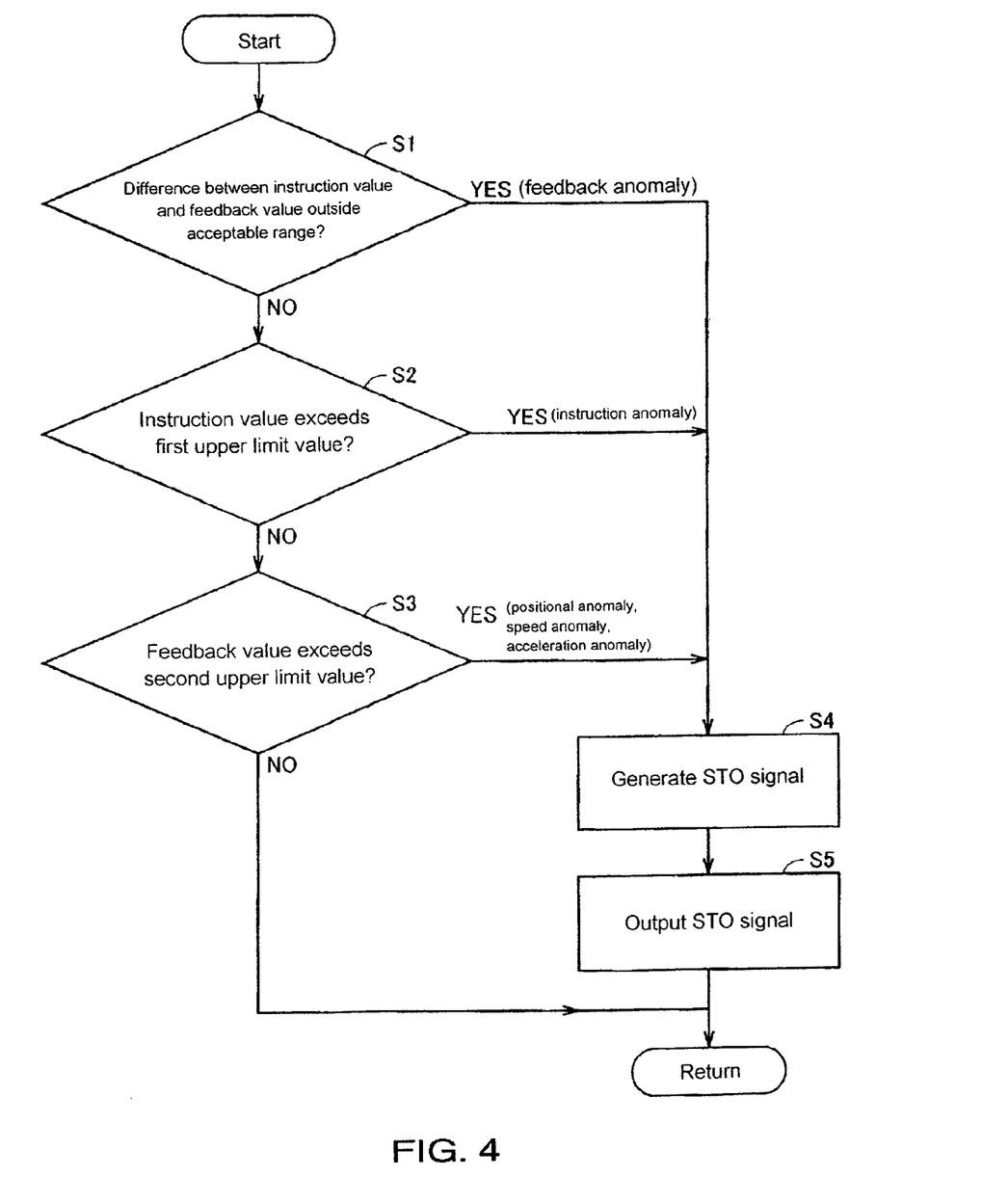
FIG. 4 is a flowchart illustrating how a stop signal is generated by the safety unit shown in FIG. 1.

FIG. 4 is a flowchart illustrating how the stop signal is generated by the safety unit shown in FIG. 1. This processing may be repeatedly executed in cycles of a control period in which the instruction value is generated (for example 2 msec, although there is no particular limitation to this).

Referring to FIGS. 4 and 1, in step S1, the safety unit 10 determines whether the difference between the speed instruction value (in FIG. 4, simply indicated as an "instruction value") and the feedback value that are sent by the servo driver 4 is outside the acceptable range. If the output from the comparison unit 32 indicates that the difference between the speed instruction value and the feedback value exceeds the upper limit value of the acceptable range, or indicates that the difference is lower than the lower limit value of the acceptable range, then the signal generating unit 33 determines that the difference between the instruction value and the feedback value is outside the acceptable range. In such a case (YES in step S1), there is a feedback anomaly and thus the processing proceeds to step S4. In contrast, if the signal generating unit 33 determines that the difference between the instruction value and the feedback value is within the acceptable range (NO in step S1), then the processing proceeds to step S2.

In step S2, the safety unit 10 determines whether the speed instruction value exceeds the first upper limit value. If the output from the comparison unit 32 indicates that the speed instruction value exceeds the first upper limit value, the signal generating unit 33 determines that the speed instruction value exceeds the first upper limit value. In such a case (YES in step S2), there is an instruction anomaly and thus the processing proceeds to step S4. In contrast, if the signal generating unit 33 determines that the speed instruction value is not greater than the first upper limit value (NO in step S2), then the processing proceeds to step S3.

In step S3, the safety unit 10 determines whether the feedback value exceeds the second upper limit value. If the output from the comparison unit 32 indicates that the feedback value exceeds the second upper limit value, then the signal generating unit 33 determines that the feedback value exceeds the second upper limit value. In such a case (YES in step S3), there is a positional anomaly, a speed anomaly or an acceleration anomaly and thus the processing proceeds to step S4. In contrast, when the signal generating unit 33 determines that the feedback value is not greater than the second upper limit value, (NO in step S3), the entire processing returns to the main routine.

In step S4, the signal generating unit 33 generates an STO signal. In step S5, the signal generating unit 33 outputs the STO signal. When the processing in step S5 ends, the entire processing returns to the main routine.

Note that execution of the processing in steps S1 to S3 is not limited to the order shown in FIG. 4, and the processing in steps S1 to S3 may be executed in a different order. Also, the processing in step S1 to S3 may be executed in parallel.

In such a manner, with the present embodiment of the disclosure, a stop signal to stop output of torque by the servo motor is generated in any of the following cases: (1) where the difference between the speed instruction value and the feedback value is outside a predetermined acceptable range (setting range); (2) where the speed instruction value exceeds a predetermined first upper limit value; (3) where the feedback value exceeds a predetermined second upper limit value. With the present embodiment of the disclosure, various types of anomalies that occur while controlling the servo motor can be promptly detected. Consequently, it is possible to promptly stop the servo motor when an anomaly has occurred while controlling the servo motor. Note that in the present embodiment of the disclosure, the condition for generating the stop signal is satisfaction of any of the above conditions (1) to (3), but any number of the above conditions (1) to (3) may be combined.

Figure 5:
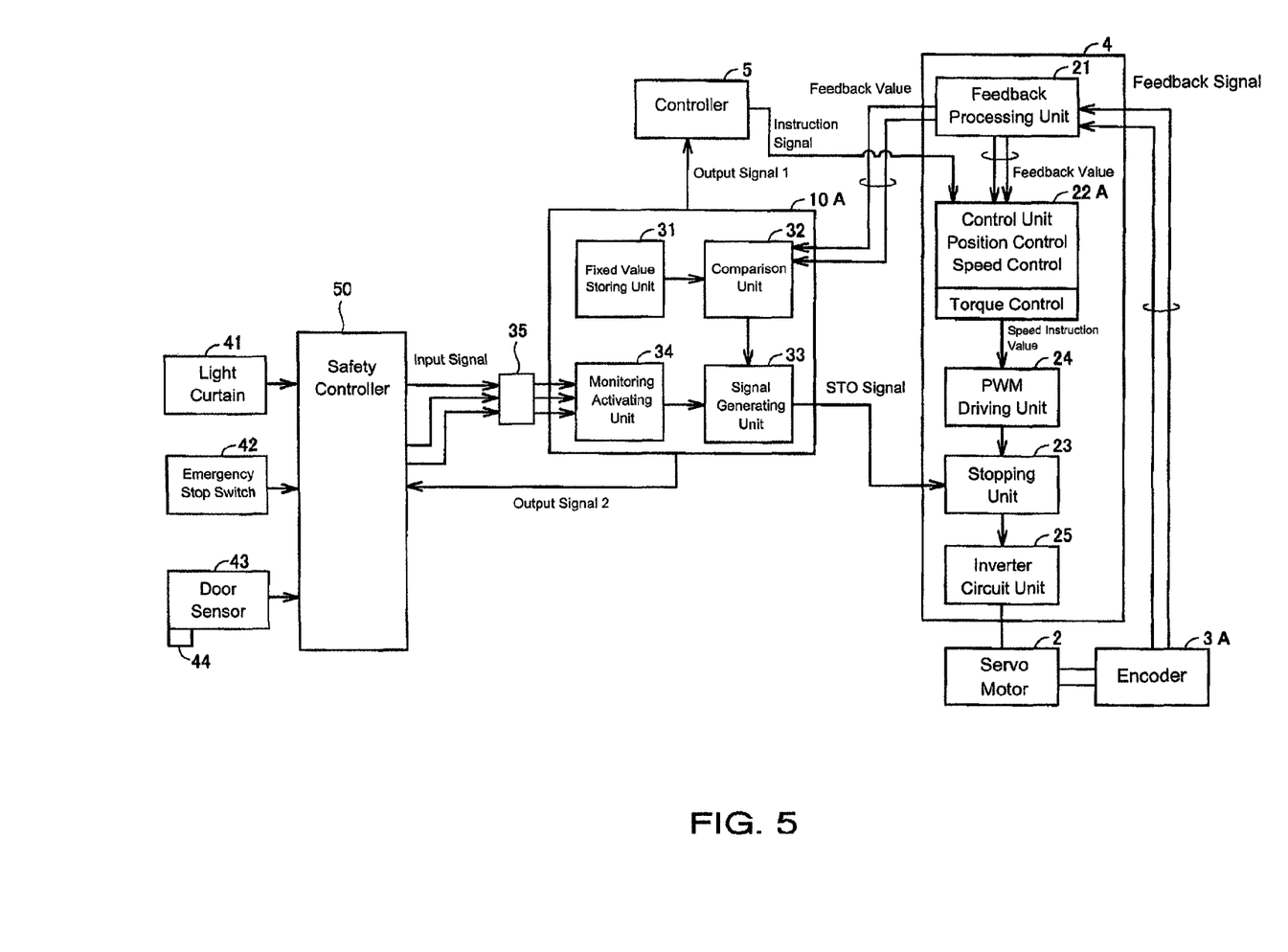
FIG. 5 is a diagram showing a configuration of a comparative example of an embodiment of the disclosure.

FIG. 5 is a diagram showing a configuration of a comparative example of an embodiment of the disclosure. As shown in FIG. 5, the servo system includes an encoder 3A instead of the encoder 3. The encoder 3A includes redundant (duplicate) circuitry, for example, and outputs redundant feedback signals.

The feedback processing unit 21 receives the redundant feedback signals from the encoder 3A and at the same time generates feedback values based on the received redundant feedback signals. Accordingly, the feedback processing unit 21 generates redundant feedback values. The redundant feedback values are sent to a control unit 22A, and also sent to the comparison unit 32 of a safety unit 10A. The comparison unit 32 compares the two feedback values to each other, and at the same time compares each feedback value with the upper limit value thereof (corresponding to the above-described second upper limit value). In the case where the difference between the two feedback values is outside the acceptable range, or in the case where any of the two feedback values exceeds the upper limit value, the signal generating unit 33 generates the STO signal.

In this manner, with the configuration shown in FIG. 5, the safety unit 10A determines whether or not to generate the STO signal based on only the behavior of the feedback values. However, by considering the responsiveness of the feedback value to the change in the instruction value, there may be a delay in the detection of an anomaly in the output of the encoder 3A.

Figure 6:
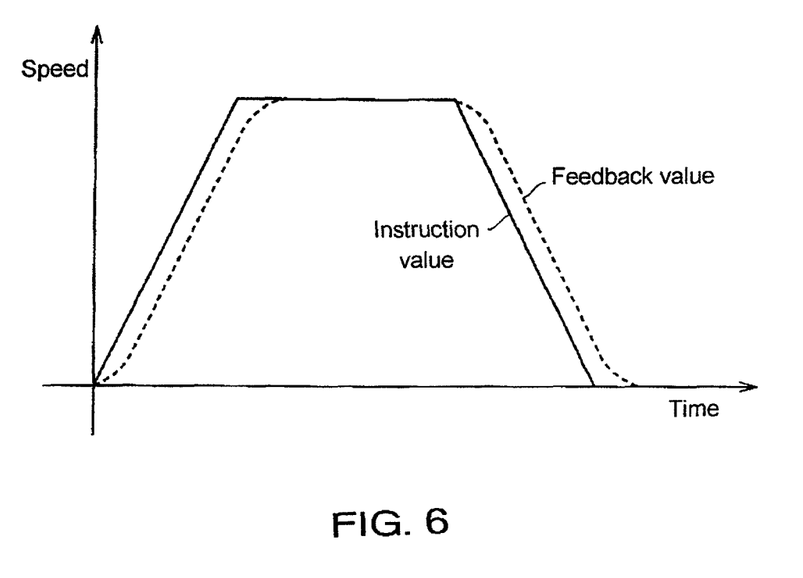
FIG. 6 is a diagram illustrating a typical change of a speed instruction value and a feedback value in the feedback control of the servo system.

FIG. 6 is a diagram illustrating a typical change of the speed instruction value and the feedback value in the feedback control of the servo system. Referring to FIG. 6, constant acceleration driving (trapezoidal driving) is employed as a driving pattern of the servo motor. The speed instruction value varies depending on the trapezoidal acceleration/deceleration pattern. Since the feedback value changes so as to match this corresponding speed instruction value, it changes with a delay compared to the speed instruction value.

When the feedback control is operating normally, it is expected that the speed instruction value and the feedback value respectively vary as illustrated in FIG. 6. However, when the output from the encoder is abnormal, the feedback value varies differently from this normal pattern. In addition, also when the instruction value is abnormal, the instruction value varies differently from this normal pattern.

Figure 7A:
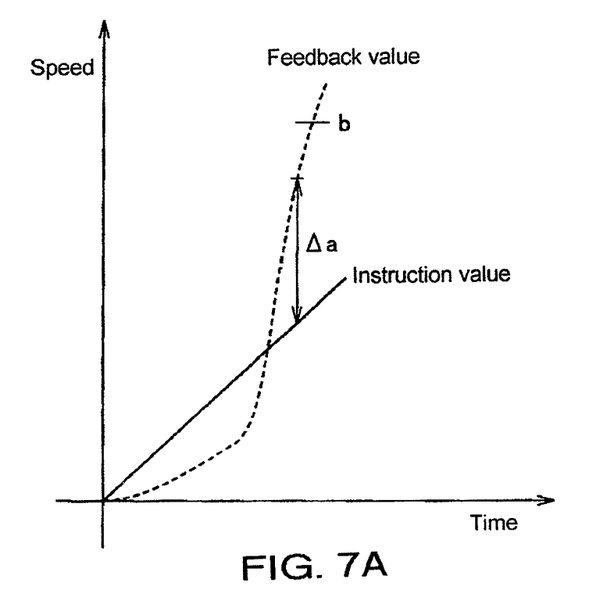
FIG. 7A is a conceptual diagram illustrating a case in which the behavior of the feedback value is abnormal.
Figure 7B:
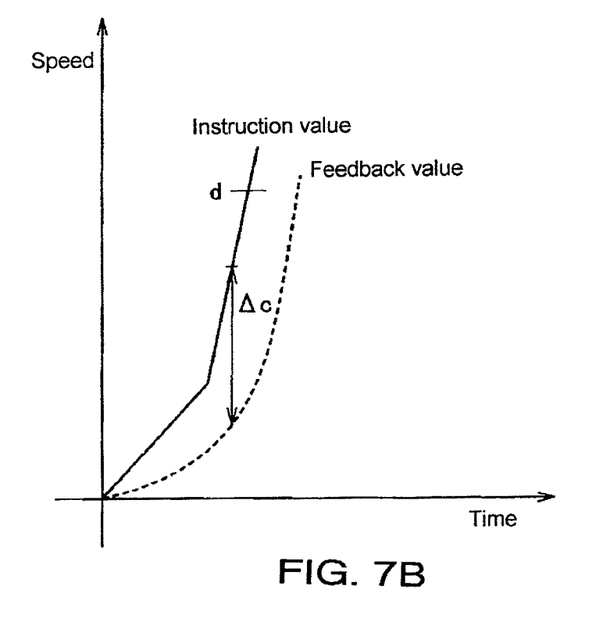
FIG. 7B is a conceptual diagram illustrating a case in which the behavior of the instruction value is abnormal.

FIG. 7 is a conceptual diagram illustrating cases in which the behavior of the feedback value and the instruction value is abnormal. FIG. 7A shows a case in which the behavior of the feedback value is abnormal. For example, when an anomaly has occurred in the encoder, the feedback value changes without following the instruction value. As illustrated in FIG. 7A, the feedback value rapidly increases due to an anomaly in the encoder, for example. It can be expected that as long as no outside force is applied to the servo motor, the rotational speed of the servo motor is never larger than the instruction value. As a result, in this case, it seems that an anomaly has occurred in the encoder.

Due to this increase of the feedback value, the difference Δa between the feedback value and the instruction value leaves the acceptable range. Also, when a rapid increase of the feedback value continues, the feedback value exceeds an upper limit value b.

With the configuration of the servo system shown in FIG. 5, the feedback value is redundant. Therefore, it is also possible to detect an anomaly in the feedback value when the difference between the two feedback values leaves the setting range. It is also possible to detect an anomaly in the feedback value when any of the two feedback values exceeds the upper limit value b. However, the feedback value varies delayed from the instruction value. For this reason, an anomaly may be detected with delay.

In contrast, with the configuration of the present embodiment of the disclosure, an anomaly in the feedback value can be detected in any of a case in which the difference Δa between the instruction value and the feedback value is outside the acceptable range, or a case in which the feedback value exceeds the upper limit value b. By comparing an instruction value with the feedback value corresponding to that instruction value, an anomaly in the feedback value can be promptly detected.

FIG. 7B illustrates a case in which the behavior of the instruction value is abnormal. For example, when an anomaly occurs in a controller, network, a servo driver or the like, the instruction value may vary differently from its normal pattern. As illustrated in FIG. 7B, for example, when the instruction value rapidly increases, a difference Δc between the instruction value and the feedback value leaves the acceptable range. Also, when the rapid increase of the instruction value continues, the instruction value exceeds an upper limit value d.

With the configuration of the servo system shown in FIG. 5, only the feedback value is monitored and thus it is difficult to detect an anomaly in the instruction value. In contrast, with the configuration of the present embodiment of the disclosure, an anomaly in the instruction value can be detected in any of a case in which the difference Δc between the instruction value and the feedback value is outside the acceptable range, or a case in which the instruction value exceeds the upper limit value d.

In this manner, with the present embodiment of the disclosure, an anomaly in the feedback value and the instruction value can be promptly detected. That is, various anomalies in the servo system can be promptly detected. In contrast, with the configuration shown in FIG. 5, only the feedback value is monitored, and thus although an anomaly in the encoder can be detected, it is difficult to detect other anomalies in the servo system.

In addition, with the present embodiment of the disclosure, various anomalies in the servo system can be promptly detected, and thus the servo motor can be promptly stopped. Consequently, a safety function can be realized For example, when the difference between a speed instruction value generated in a certain point in time and a feedback value corresponding to the instruction value is outside the acceptable range, the speed instruction value can be set to 0 by a stopping unit before the next speed instruction value is generated. Therefore, the servo motor can be promptly stopped when an anomaly has occurred.

According to the present embodiment of the disclosure, even when a logic circuit incorporated in an encoder does not have a configuration dedicated to detecting anomalies in compliance with IEC61508 or the like, anomalies in the detection value (feedback value) of the encoder can be detected. Therefore, it is possible to construct a servo system that complies with safety standards (e.g., IEC61800-5-2) by using a conventional encoder. As a result, safety of the servo system can be assured without replacing the encoder used in the servo system with an encoder having a safety function.

The disclosed embodiments are illustrated only by way of example, and the disclosure is not limited to the embodiments. The scope of the disclosure is expressed by not the above description, but claims of the disclosure. It is intended that the disclosure includes the meaning equivalent to claims of the disclosure and all changes within the scope of the disclosure.

What is claimed is:

1. A servo system comprising:
a servo motor;
a controller configured to output an instruction signal that controls driving of the servo motor;
an encoder configured to detect an operation of the servo motor and output a feedback signal representing the detected operation;
a servo driver configured to generate an instruction value for the operation of the servo motor using the instruction signal from the controller and the feedback signal from the encoder, and drive the servo motor in accordance with the instruction value; and
a safety monitor configured to output a stop signal to be sent to the servo driver in order to stop an output of torque from the servo motor when the operation of the servo motor is in an abnormal condition,
wherein the servo driver stops the output of torque from the servo motor as a result of receiving the stop signal from the safety monitor, and
the safety monitor acquires from the servo driver the instruction value and a feedback value that is obtained based on the feedback signal as a result of the servo motor having been driven in accordance with the instruction value, and generates the stop signal when a determination value calculated with the instruction value and the feedback value is in a first abnormal condition or when the determination value is not in the first abnormal condition and at least one of the instruction value and the feedback value is in a second abnormal condition.

2. The servo system according to claim 1,
wherein the determination value is a difference between the instruction value and the feedback value,
the first abnormal condition corresponds to a first condition that the determination value is outside a predetermined acceptable range, and
the second abnormal condition corresponds to at least a second condition that the instruction value exceeds a predetermined first upper limit value and
a third condition that the feedback value exceeds a predetermined second upper limit value.

3. The servo system according to claim 2, wherein the instruction value comprises a value for instructing a rotational speed of the servo motor.

4. The servo system according to claim 1, wherein the instruction value comprises a value for instructing a rotational speed of the servo motor.

5. The servo system according to claim 1, wherein the servo driver stops a supply of electricity to the servo motor in response to the stop signal.

6. A servo motor driving device for driving a servo motor, the servo motor driving device comprising:
a servo driver configured to generate an instruction value for an operation of the servo motor using an instruction signal for controlling driving of the servo motor sent by a controller and a feedback signal for detecting the operation of the servo motor sent by an encoder, and drive the servo motor in accordance with the instruction value; and
a safety monitor configured to generate a stop signal which is sent to the servo driver in order to stop an output of torque from the servo motor when the operation of the servo motor is in an abnormal condition,
wherein the servo driver controls the servo motor as a result of receiving the stop signal from the safety monitor such that the servo motor stops an output of torque, and the safety monitor acquires from the servo driver the instruction value and a feedback value that is obtained based on the feedback signal as a result of the servo motor having been driven in accordance with the instruction value, and generates the stop signal when a determination value calculated with the instruction value and the feedback value is in a first abnormal condition or when the determination value is not in the first abnormal condition and at least one of the instruction value and the feedback value is in a second abnormal condition.

7. The servo motor driving device according to claim 6, wherein the determination value is a difference between the instruction value and the feedback value,
the first abnormal condition corresponds to a first condition that the determination value is outside a predetermined acceptable range, and
the second abnormal condition corresponds to at least a second condition that the instruction value exceeds a predetermined first upper limit value; and
a third condition that the feedback value exceeds a predetermined second upper limit value.

8. The servo motor driving device according to claim 7, wherein the instruction value comprises a value for instructing a rotational speed of the servo motor.

9. The servo motor driving device according to claim 6, wherein the instruction value comprises a value for instructing a rotational speed of the servo motor.

10. The servo motor driving device according to claim 6, wherein the servo driver stops a supply of electricity to the servo motor in response to the stop signal.

11. A safety monitor used in a servo system,
wherein the servo system comprises:
a servo motor;
a controller configured to output an instruction signal that controls driving of the servo motor;
an encoder configured to detect an operation of the servo motor and generate a feedback signal representing the detected operation; and
a servo driver configured to generate an instruction value for the operation of the servo motor by using the instruction signal from the controller and the feedback signal from the encoder, and drive the servo motor in accordance with the instruction value, the servo driver controlling the servo motor as a result of receiving a stop signal from the safety monitor such that the servo motor stops an output of torque,
the safety monitor comprising:
a determiner configured to determine whether a determination value calculated with the instruction value and the feedback value is in a first abnormal condition or when the determination value is not in the first abnormal condition, whether at least one of the instruction value and the feedback value being in a second abnormal condition; and
a signal generator configured to generate the stop signal when the determiner determines that the determination value calculated with the instruction value and the feedback value is in the first abnormal condition or when the determination value is not in the first abnormal condition, the at least one of the instruction value and the feedback value is in the second abnormal condition.

12. The safety monitor according to claim 11,
wherein the determination value is a difference between the instruction value and the feedback value,
the first abnormal condition corresponds to a first condition that the determination value is outside a predetermined acceptable range;
the second abnormal condition corresponds to at least a second condition that the instruction value exceeds a predetermined first upper limit value and
a third condition that the feedback value exceeds a predetermined second upper limit value.

13. The safety monitor according to claim 12, wherein the instruction value comprises a value for instructing a rotational speed of the servo motor.

14. The safety monitor according to claim 11, wherein the instruction value comprises a value for instructing a rotational speed of the servo motor.

15. A method for controlling a servo system,
the servo system having:
a servo motor;
a controller configured to output an instruction signal which controls driving of the servo motor;
an encoder configured to detect an operation of the servo motor and generate a feedback signal representing the detected operation;
a servo driver configured to generate an instruction value for the operation of the servo motor using the instruction signal from the controller and the feedback signal from the encoder, and drive the servo motor in accordance with the instruction value; and
a safety monitor configured to control the servo driver such that the servo motor stops an output of torque when the operation of the servo motor is in an abnormal condition,
the servo driver being configured such that the output of torque from the servo motor is inhibited as a result of receiving a stop signal from the safety monitor,
the control method comprising:
determining whether a determination value calculated with the instruction value and the feedback value is in a first abnormal condition or when the determination value is not in the first abnormal condition, whether at least one of the instruction value and the feedback value is in a second abnormal condition; and
generating the stop signal when it is determined that the determination value calculated with the instruction value and the feedback value is in the first abnormal condition or when the determination value is not in the first abnormal condition, the at least one of the instruction value and the feedback value being in the second abnormal condition.

16. The method for controlling a servo system according to claim 15,
wherein the determination value is a difference between the instruction value and the feedback value
the first abnormal condition corresponds to a first condition that the determination value is outside a predetermined acceptable range, and
the second abnormal condition corresponds to at least a second condition that the instruction value exceeds a first upper limit value and
a third condition that the feedback value exceeds a second upper limit value.

17. The method for controlling a servo system according to claim 16, wherein the instruction value comprises a value for instructing a rotational speed of the servo motor.

18. The method for controlling a servo system according to claim 15, wherein the instruction value comprises a value for instructing a rotational speed of the servo motor.

* * * * *